US00RE38842E

(19) United States
(12) Reissued Patent
Fish et al.

(10) Patent Number: US RE38,842 E
(45) Date of Reissued Patent: Oct. 25, 2005

(54) VACUUM CLEANER BAG DOCKING ASSEMBLY

(75) Inventors: William G. Fish, Gulfport, MS (US); Charles F. Malone, Huntsville, AL (US)

(73) Assignee: Oreck Holdings, LLC, Cheyenne, WY (US)

(21) Appl. No.: 10/086,221

(22) Filed: Feb. 27, 2002

Related U.S. Patent Documents

Reissue of:
(64) Patent No.: 6,033,451
Issued: Mar. 7, 2000
Appl. No.: 09/107,710
Filed: Jun. 30, 1998

(51) Int. Cl.[7] ..... A47L 5/28
(52) U.S. Cl. ..... 55/374; 55/376; 55/377; 55/378; 55/DIG. 2; 15/350; 15/351
(58) Field of Search ..... 55/374, 376, 377, 55/378, 382, DIG. 2; 15/350, 351

(56) References Cited

U.S. PATENT DOCUMENTS 3,933,451 A * 1/1976 Johansson ..... 55/DIG. 2
4,262,384 A * 4/1981 Bowers ..... 55/DIG. 2
4,274,847 A * 6/1981 Crener ..... 55/DIG. 2
4,381,192 A * 4/1983 Grimard ..... 55/376
4,539,026 A * 9/1985 Kuplas ..... 55/376
4,591,369 A * 5/1986 Stewart et al. ..... 55/374
4,678,486 A * 7/1987 Jacob et al. ..... 55/374
4,738,697 A * 4/1988 Westergren ..... 55/376
5,028,245 A * 7/1991 Stein et al. ..... 55/373
5,064,455 A * 11/1991 Lackner ..... 55/375
5,089,038 A * 2/1992 Kopco et al. ..... 55/374
5,092,915 A * 3/1992 Lackner ..... 55/375
5,226,941 A * 7/1993 Uibel et al. ..... 55/367
5,230,724 A * 7/1993 Marafante et al. ..... 55/367
5,464,460 A * 11/1995 Bosses ..... 55/374
5,544,385 A * 8/1996 Jailor et al. ..... 15/350
5,688,298 A * 11/1997 Bosses ..... 55/367
5,820,643 A * 10/1998 Lienenluke et al. ..... 55/367
6,379,408 B1 * 4/2002 Embree et al. ..... 55/DIG. 2
6,406,507 B1 * 6/2002 Paterson et al. ..... 55/DIG. 2

* cited by examiner

*Primary Examiner*—Minh-Chau T. Pham
(74) *Attorney, Agent, or Firm*—Setter Ollila LLC

(57) ABSTRACT

For use with vacuum cleaner bags of the type having a substantially rigid collar surrounding the bag opening, and with vacuum cleaners of the type having a dirty air outlet nozzle, a vacuum bag docking assembly is shown and described. The assembly incorporates an anchor member having a central opening for closely receiving the dirty air outlet nozzle. The assembly also incorporates a mounting member which engages the collar on the vacuum bag to secure the bag to the bag mounting member. The bag mounting member is pivotally connected to the anchor member, and moves between a loading position in which the bag can be inserted or removed from the mounting member, and a working position in which the bag opening engages the dirty air outlet nozzle.

39 Claims, 6 Drawing Sheets

VACUUM CLEANER BAG DOCKING ASSEMBLY

Matter enclosed in heavy brackets [ ] appears in the original patent but forms no part of this reissue specification; matter printed in italics indicates the additions made by reissue.

TECHNICAL FIELD

The invention is directed to a bag docking assembly and, more particularly, to an assembly for docking a vacuum bag in the proper orientation for engagement with a dirty air outlet nozzle on a vacuum cleaner, and for retaining the vacuum bag in the position of engagement.

BACKGROUND OF THE INVENTION

Vacuum cleaners, such as upright vacuums, remove dirt from a carpet by creating a suction strong enough to draw the dirt particles from a section of the carpet up into the vacuum cleaner where the dirty air is passed through a vacuum bag in which the entrained dirt is captured. To increase the efficiency of this process, a base portion of the vacuum cleaner often has a roller brush for agitating dirt from the carpet as it is being vacuumed.

Inside the vacuum cleaner, a dirty air conduit transfers the dirty air from the base of the vacuum cleaner to the vacuum bag. The dirty air conduit runs up a handle assembly or, in cases where the dirty air conduit is rigid, the dirty air conduit can itself function as a portion of the handle. At the end of the dirty air conduit opposite the floor there is a dirty air outlet nozzle where the dirty air exits from the dirty air conduit. The vacuum bag is attached to the dirty air outlet nozzle.

The vacuum bag has a bag opening that fits closely over the dirty air outlet nozzle. The vacuum bag is otherwise a completely closed bag that is made from a porous material that allows air to flow through it, but which is too fine for most dirt particles to pass through. As dirty air passes through the vacuum bag, the air is forced through the porous material and the dirt is trapped in the bag. The bag thus collects the dirt from the dirty air and, more importantly, from the floor. Because the material of the vacuum bag is often fragile and can get very dusty, the vacuum bag is commonly held within a protective outer bag.

The outer bag is typically placed over the dirty air outlet nozzle first, with the dirty air outlet nozzle extending through a hole in the outer bag. A clip is then forced over the dirty air outlet nozzle between the outer bag and a protrusion on the outer surface of the dirty air outlet nozzle. The clip retains the outer bag in the proper position for use. Finally, the vacuum bag is placed over the remaining length of the dirty air outlet nozzle, and the outer bag closed.

To eliminate the need for emptying or cleaning the vacuum bag after it has collected dirt, vacuum bags have been modified over the years to be disposable. This allows the user to merely discard the dirty vacuum bag and replace it with a new, clean one. To adapt the vacuum bags for easy replacement, the bags have been designed so that the bag opening can be releasably engaged with the dirty air outlet nozzle.

One common vacuum bag design incorporates a reinforced area, known as a collar, surrounding the bag opening. The collar is usually a square or rectangular piece of thin cardboard. To install the vacuum bag, the user holds the collar by one or more edges, and forces the bag opening over the dirty air outlet nozzle. The collar can be designed with an elastic seal extending inward from the circumference of the bag opening to further seal the gap between the dirty air outlet nozzle and the bag opening.

Two primary problems exist with disposable vacuum bags. First, because the disposable vacuum bag is designed to be held within the outer bag, the dirty air outlet nozzle is often positioned deep within the outer bag and is hidden from sight. The user can initially look into the outer bag and see the dirty air outlet nozzle; however, when the vacuum bag is partially positioned for engagement with the dirty air outlet nozzle, the vacuum bag interferes with whatever unobscured view the user had of the dirty air outlet nozzle. As a result, the vacuum bag must be installed entirely be feel. Installing a vacuum bag by feel increases the possibility that the bag opening will not be properly aligned with the dirty air outlet nozzle when the installer pushes the collar onto the vacuum cleaner. If the collar is not aligned properly, forcing the collar onto the dirty air outlet nozzle can bend or break the collar. A vacuum bag with a bent or broken collar is more likely to leak or disengage during operation.

Another problem associated with disposable vacuum bags is that the vacuum bag is not held firmly to the dirty air outlet nozzle. The collar is often held onto the dirty air outlet nozzle by a small protrusion or a thin tab of cardboard. When the vacuum cleaner is turned on, the air rushing into the vacuum bag tends to urge the collar in a direction of disengagement from the dirty air outlet nozzle. As the vacuum bag fills, the pressure increases and, consequently, so does the force on the collar. If the collar is damaged during installation, or if the cardboard tab is not strong enough, the bag can disengage during operation, allowing dirty air to fill the outer bag. This results in the outer bag, which is not disposable, becoming soiled with dust and dirt.

Numerous different collar arrangements have been designed to retain the collar over the dirty air outlet nozzle. See, for example, U.S. Pat. No. 5,092,915 to Lackner; U.S. Pat. No. 5,064,455 to Lackner; U.S. Pat. No. 5,464,460 to Bosses; and U.S. Pat. No. 4,678,486 to Jacob et al. These designs generally incorporate protrusions on the dirty air outlet nozzle that engage with the collar. The interference between the protrusions and the collar retains the collar on the dirty air outlet nozzle. As with the traditional designs, if the collar is damaged, the vacuum bag can still leak or disengage from the dirty air outlet nozzle.

One invention, U.S. Pat. No. 5,688,298 to Bosses, attempts to solve the problem of aligning the vacuum bag with the dirty air outlet nozzle by adding an additional layer on the surface of the collar. The additional layer has a large, circular opening. The user can lightly press the face of the collar against the dirty air outlet nozzle and move the collar around until the dirty air outlet nozzle falls into the gap created by the additional layer. This lets the user know that the collar is in the proper position to be pressed against the dirty air outlet nozzle. This design does not incorporate any additional features to help retain the collar on the dirty air outlet nozzle.

One attempted solution to the problems of both alignment and retention is discussed in U.S. Pat. No. 5,089,038 to Kopko et al. This invention is designed for use with a vacuum cleaner having a rigid housing surrounding both the vacuum bag and the dirty air outlet nozzle. A hinge is integrally formed to the inside of the housing. A mounting plate holding the vacuum bag by its collar is attached to the hinge, and pivots to engage and disengage the vacuum bag from the dirty air outlet nozzle. The hinge is designed with positive stops to prevent the mounting plate from rotating too far. When the mounting plate is rotated to the point of engagement, the collar on the vacuum bag seals with the dirty air outlet nozzle. When the mounting plate is rotated to the point of disengagement, a user accessing the unit from the back of the housing may remove the vacuum bag from the mounting plate and replace it with a new one.

One problem associated with the Kopko et al. invention is that it is limited to use on vacuum cleaners having rigid housings. Without a rigid housing, the invention does not provide or suggest any place to attach the hinge. Another problem is that the hinge is designed with positive stops at the rotational limits. The mounting plate is thus only free to rotate over a limited angle. This limits the number of orientations in which the invention may be applied.

A need therefore exists for an improved bag docking assembly for aligning a vacuum bag with a dirty air outlet nozzle, and for retaining the vacuum bag in the position of engagement.

SUMMARY OF THE INVENTION

It is therefore an object of this invention to provide an improved bag docking assembly for aligning a vacuum bag for engagement with a dirty air outlet nozzle on a vacuum cleaner, and for retaining the vacuum bag in the position of engagement. The invention also serves to retain an outer bag to the vacuum cleaner. The invention is directed to a vacuum cleaner bag docking assembly for use with vacuum cleaner bags of the type having a substantially rigid mounting collar surrounding the bag opening. The assembly incorporates an anchor member and a mounting member.

The anchor member serves to attach the bag docking assembly to the vacuum cleaner. The anchor member can be a substantially flat piece of plastic having a central opening for closely receiving the dirty air outlet nozzle on the vacuum cleaner. The central opening can have a shoulder for engaging a rim or similar protrusion formed about the perimeter of the dirty air outlet nozzle. One edge of the anchor member can have a first hinge member.

The mounting member can also be fabricated from a piece of flat plastic. The mounting member can have side walls, an end wall, and channels about a portion of its perimeter for engagement with the edges of the collar. The mounting member has a central opening corresponding to the location of the opening in the vacuum bag when the collar is engaged with the mounting member. One edge of the mounting member can have a second hinge member complementary to the first hinge member on the anchor member.

During operation, the anchor member can be slid over the dirty air outlet nozzle with the central opening in the anchor member closely fitting around the perimeter of the dirty air outlet nozzle. The edge having the hinge member is preferably oriented at the bottom. The resilient material of the anchor member is forced beyond a rim or similar protrusion on the dirty air outlet nozzle, and the rim holds the anchor member in place against the handle assembly of the vacuum cleaner.

The mounting member is pivotally connected to the anchor member by engagement of the first and second hinge members. The mounting member is free to rotate over an angle of approximately 180 degrees, from the point where the mounting member abuts the anchor member (the working position) to the point where the mounting member abuts the vacuum cleaner handle. At some point between the two angles, the mounting member is in a position that is convenient for the insertion and removal of the bag collar from the mounting member (the loading position).

When the mounting member is in the loading position, the bag collar can be inserted or removed from the mounting member while in plain view of the user. The edges of the bag collar slidably engage the channels in the mounting member and the channels retain the collar in the proper location and orientation to engage the dirty air outlet nozzle. When the mounting member is rotated into the working position, the bag opening engages the dirty air outlet nozzle. Because the mounting member holds the collar in the proper orientation for engagement, the user does not need to align the bag with the dirty air outlet nozzle. The user can merely pivot the mounting member against the anchor member and thereby engage the bag with the dirty air outlet nozzle.

In another embodiment, the opening in the mounting member is adapted to closely receive the anchor member when the assembly is in the working position. A latch can retain the mounting member against the anchor member, thereby retaining the vacuum bag in the position of engagement with the dirty air outlet nozzle. The latch can be a resilient protrusion extending from the perimeter of the anchor member. When the mounting member is pivoted to engage the anchor member, the protrusion is forced through the opening and retains the assembly in the working position.

In yet another embodiment, the anchor member can have an entrance channel along one of its edges and a reduced neck portion between the entrance channel and the central opening. In this embodiment, the anchor member engages the dirty air outlet nozzle from a transverse direction, with the resilient neck portion distorting around the dirty air outlet nozzle. Once the dirty air outlet nozzle is engaged with the central opening, the neck returns to its original shape and retains the anchor member in place.

In still another embodiment, the side walls and end wall of the mounting member intersect at opposing corners. At least one of the corners is chamfered to have a portion thereof set off at an angle to both the side wall and end wall. The collar is fabricated with a complementary profile so that the user is assured that the collar is engaged with the mounting member in the proper orientation.

DETAILED DESCRIPTION OF THE INVENTION

The present invention is directed toward a vacuum cleaner bag docking assembly for docking a vacuum cleaner bag in the proper orientation for engagement with a dirty air outlet nozzle on a vacuum cleaner, and for retaining the vacuum bag in the position of engagement. Many specific details of certain embodiments of the invention are set forth in the following description and in FIGS. 1–6 to provide a thorough understanding of such embodiments. One skilled in the art, however, will understand that the present invention may have additional embodiments, or that the invention may be practiced without several of the details described in the following description.

Figure 1:
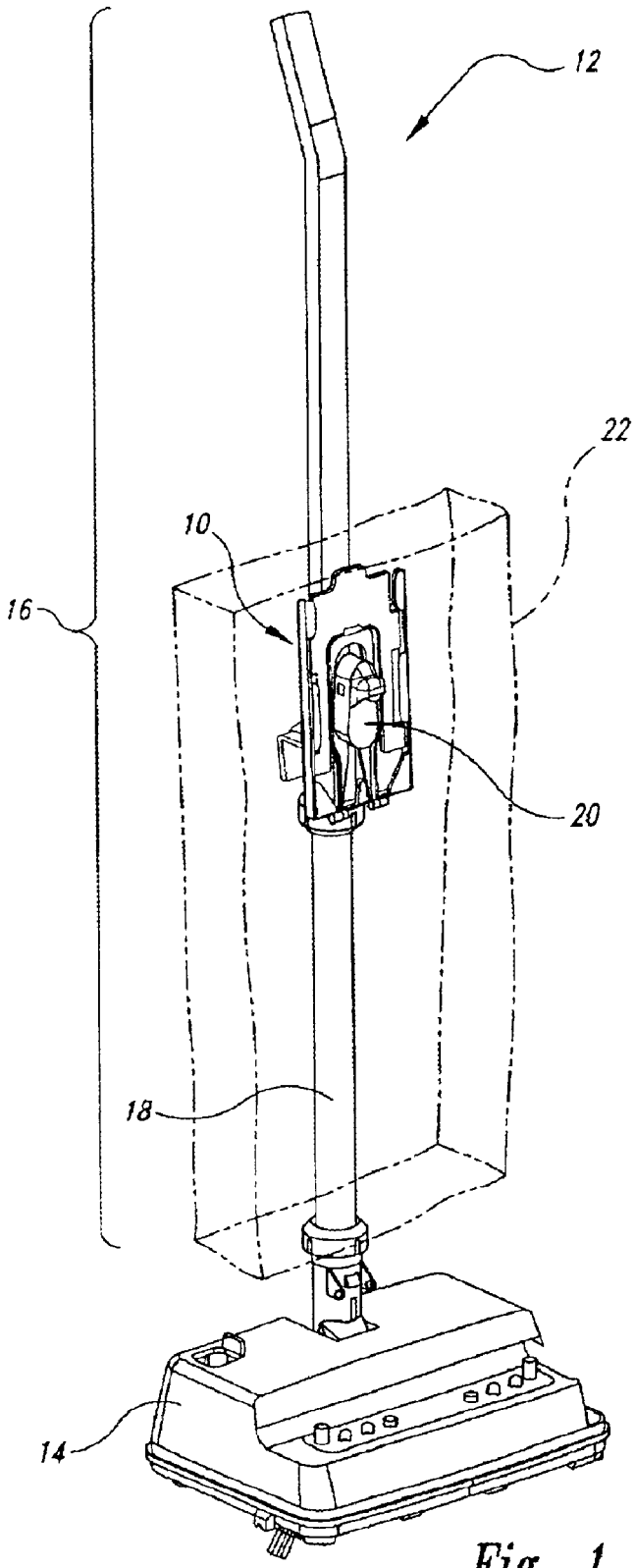
FIG. 1 is an isometric view of a vacuum cleaner incorporating a bag docking assembly according to one embodiment of the present invention.

FIG. 1 shows a bag docking assembly 10 according to one embodiment of the present invention in a position of engagement with an upright vacuum cleaner 12. The vacuum cleaner 12 has a base 14 and a handle assembly 16. In this embodiment, a portion of the handle assembly 16 is a hollow tube serving as a dirty air conduit 18. The dirty air conduit 18 connects the base 14 with a dirty air outlet nozzle 20. The dirty air conduit 18 can also be independent of the handle assembly 16. The bag docking assembly 10 is preferably removably attached to the dirty air outlet nozzle 20. A protective, outer bag 22 can be positioned around both the dirty air outlet nozzle 20 and the bag docking assembly 10.

Figure 2:
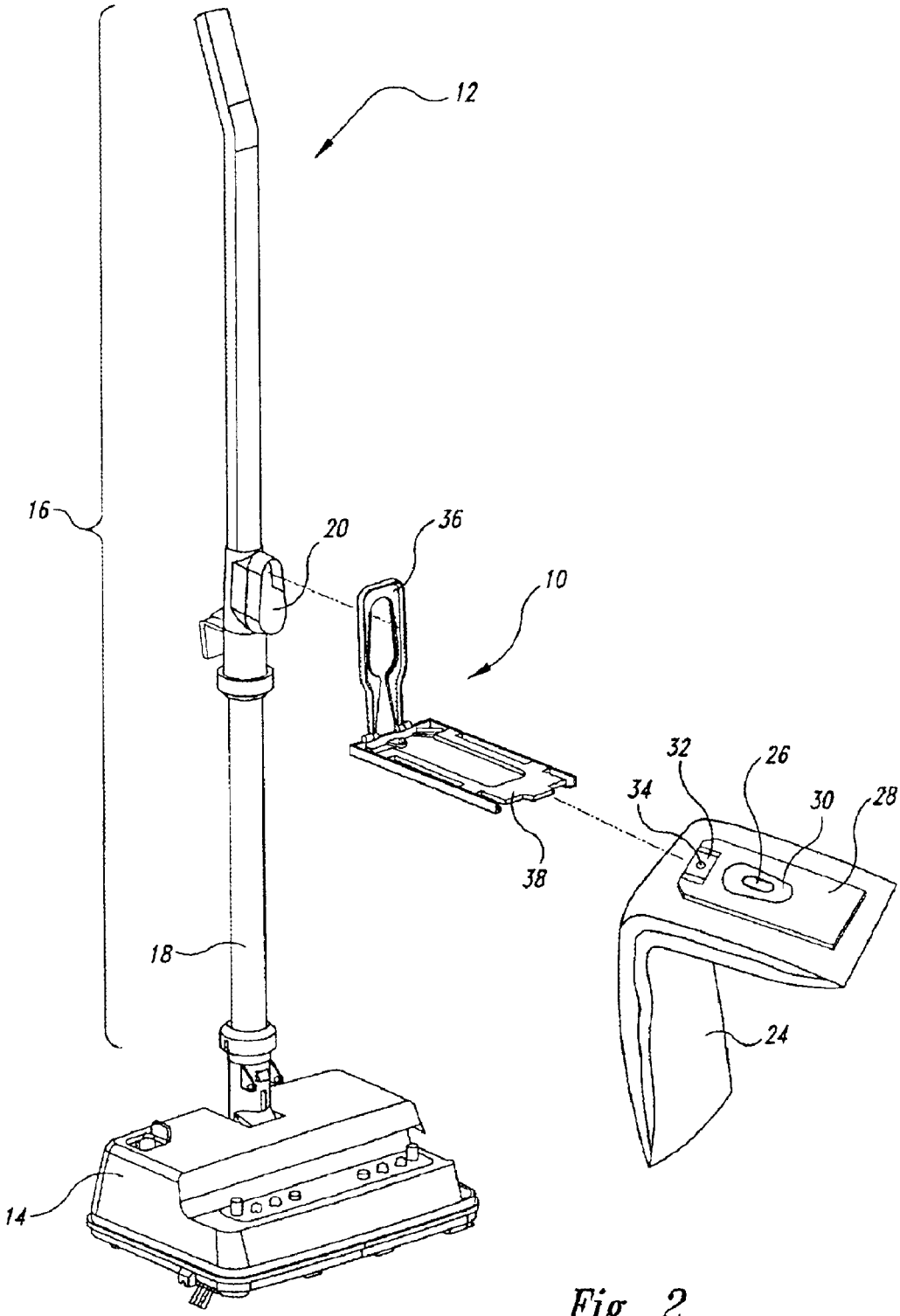
FIG. 2 is an exploded isometric view of a vacuum cleaner bag and a vacuum cleaner incorporating a bag docking assembly according to one embodiment of the present invention.

FIG. 2 shows an exploded view of a vacuum bag 24 positioned to engage the bag docking assembly 10, and the bag docking assembly 10 positioned to engage the dirty air outlet nozzle 20 on the vacuum cleaner 12. The vacuum bag 24 has a bag opening 26 through which dirty air enters the vacuum bag 24 for collection of entrained dirt. The bag opening 26 is surrounded by a reinforced collar 28. The bag opening 26 can also be surrounded by an elastic seal 30 to create a more air-tight seal when the vacuum bag 24 is engaged with the dirty air outlet nozzle 20. The vacuum bag 24 may also be designed to have a sliding panel 32 that slides between an opened position and a closed position over the bag opening 26 to prevent spillage when the vacuum bag 24 is disengaged from the vacuum cleaner 12. A retainer opening 34 is located on the sliding panel 32 to provide a grip for retaining the collar 28 and for moving the sliding panel 32.

The bag docking assembly 10 incorporates an anchor member 36 and a mounting member 38. The structure and operation of both the anchor member 36 and the mounting member 38 are discussed in detail below. Generally, the anchor member 36 retains the bag docking assembly 10 to the vacuum cleaner 12. The mounting member 38 is pivotally attached to the anchor member 36. The mounting member 38 pivots between a loading position, in which the collar 28 of the vacuum bag may be engaged or disengaged with the mounting member 38, and a working position, in which the bag opening 26 engages the dirty air outlet nozzle 20.

Figure 3:
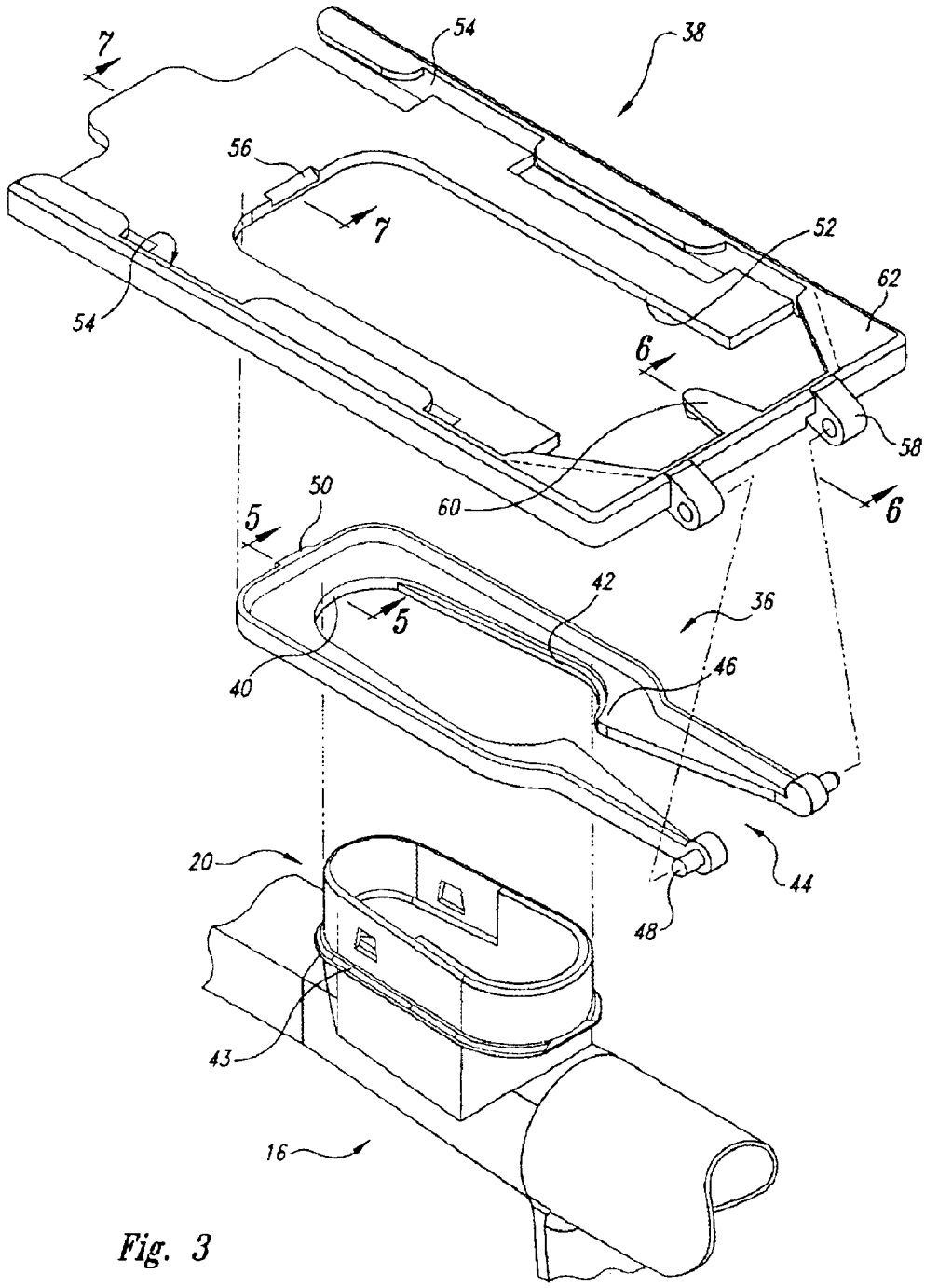
FIG. 3 is an exploded isometric view of a bag docking assembly according to one embodiment of the present invention.
Figure 4:
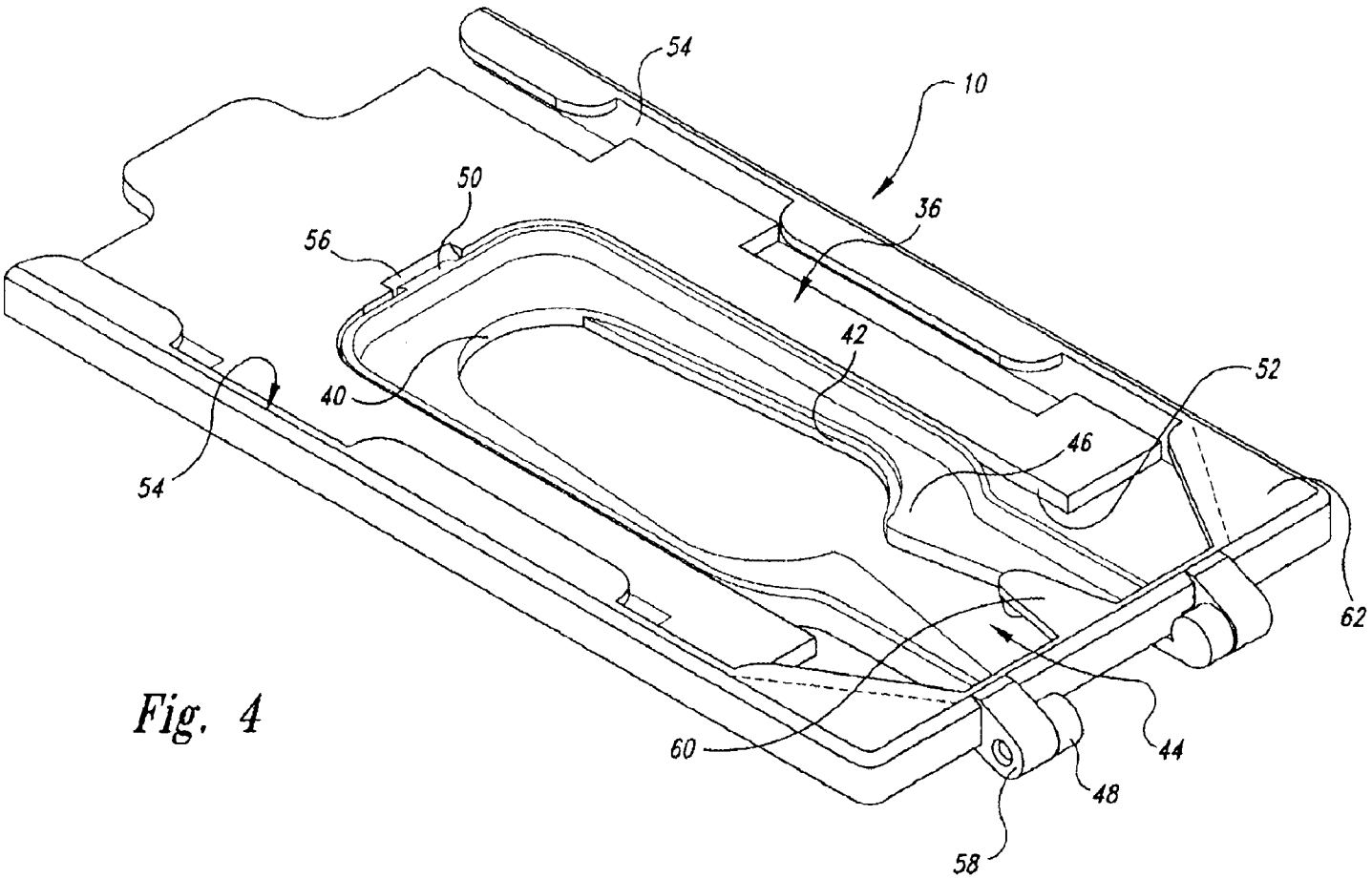
FIG. 4 is an isometric view of a bag docking assembly according to one embodiment of the present invention.

FIGS. 3 and 4 best illustrate one embodiment of the bag docking assembly 10. The anchor member 36 preferably takes the form of a substantially flat member composed of resilient material, preferably plastic, that is molded to have a central opening 40 for engaging the dirty air outlet nozzle 20. The central opening 40 in the anchor member 36 is larger than the dirty air outlet nozzle 20 to allow the dirty air outlet nozzle 20 to pass through the central opening 40 in the anchor member 36. In one embodiment, a portion of the central opening 40 is adapted to have a shoulder 42. The shoulder 42 forms a recess which closely and captively receives a complementary elevated portion on the dirty air outlet nozzle 20, such as a rim 43, a protrusion, or a flange.

In the preferred embodiment, the anchor member 36 is constructed to have an entrance channel 44 at one point about the perimeter of the anchor member 36 to allow the anchor member 36 to be inserted over the dirty air outlet nozzle 20 from a transverse direction. The entrance channel 44 is contiguous with the central opening 40 in the anchor member 36, and is separated from the central opening 40 by a reduced neck 46. The neck 46 is resilient enough to deform as it passes over the dirty air outlet nozzle 20 and return to its original shape once fully engaged. The neck 46 thus holds the anchor member 36 to the dirty air outlet nozzle 20.

To install the preferred embodiment, the anchor member 36 is first positioned adjacent the dirty air outlet nozzle 20 with the general plane of the anchor member 36 on the side of rim 43 closest to the handle assembly 16. The anchor member is slid in a direction transverse to the dirty air outlet nozzle 20 until the dirty air outlet nozzle 20 is completely engaged with the central opening 40. The anchor member 20 is then urged against the rim 43 until the recess in the shoulder 42 closely contacts the rim 43. The outer bag 22 can be interposed between the anchor member 20 and the handle assembly 16 to urge the anchor member 20 against the rim 43, or other biasing means can be substituted (FIG. 1).

In the preferred embodiment, the mounting member 38 is formed of a plastic that has been injection molded into a substantially planar body. The mounting member 38 is formed with an opening 52 that is positioned to correspond with the bag opening 26 when the collar 28 of the vacuum bag 24 is retained within the mounting member 38 in the proper position for engagement with the dirty air outlet nozzle 20 on the vacuum cleaner 12 (FIG. 2), as discussed in more detail below. In the preferred embodiment, the opening 52 in the mounting member 38 is large enough to engage the perimeter of the anchor member 36.

Figure 7:
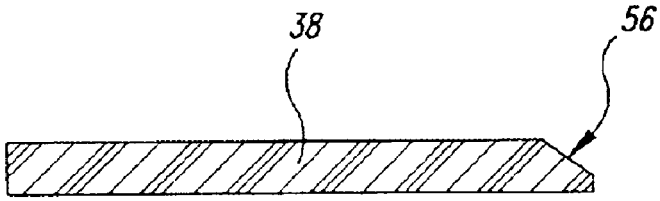
FIG. 7 is a partial section view as viewed along Section 7—7 of FIG. 3 of the mounting member of a bag docking assembly according to one embodiment of the present invention.

The mounting member 38 can be pivotally attached to the anchor member 36 by a hinge structure, such as a first hinge member 48 on the anchor member 36 and a second hinge member 58 on the mounting member 38. The mounting member 38 can rotate over an angle of up to 180 degrees between the point where it contacts the anchor member 36 and the point where it contacts the handle assembly 16. A latch mechanism, such as a protrusion 50 (FIG. 5) and a material receiving notch 56 (FIG. 7) can be utilized to retain the mounting member 38 against the anchor member 36, i.e., retain the mounting member 38 in a working position, as illustrated in FIG. 4.

Portions of the perimeter of the mounting member 38 can have one or more channels 54 for slidably receiving the edges of the collar 28 on the vacuum bag 24. The thickness of the channel 54 is slightly larger than the thickness of the collar 28 to allow the user to easily slide the collar 28 onto and off of the mounting member 38.

The perimeter of the mounting member 38 may also have a retainer member 60 (FIG. 6) that extends from the perimeter of the mounting member 38 toward the center of the opening 52. The retainer member 60 is positioned to engage the retainer opening 34 in the collar 28 of the vacuum bag 24.

Figure 8:
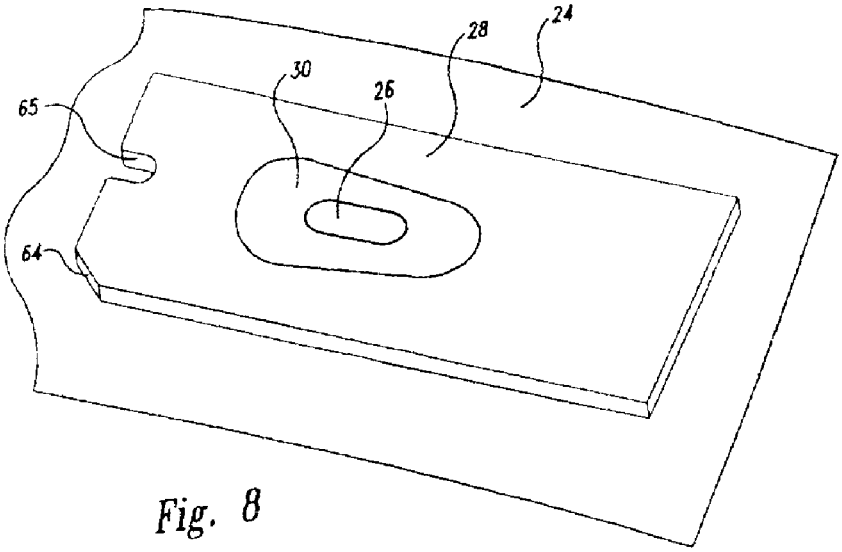
FIG. 8 is an isometric view of a vacuum bag collar according to another embodiment of the present invention.
Figure 9:
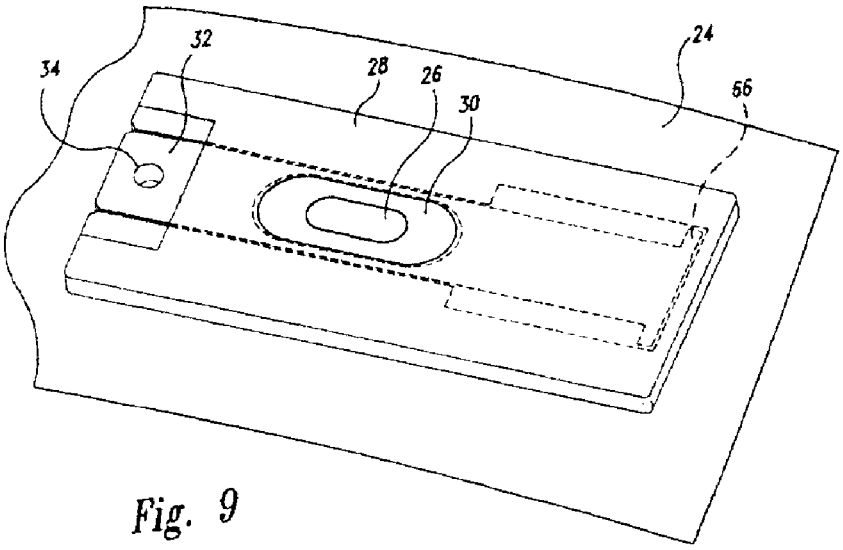
FIG. 9 is an isometric view of a vacuum bag collar according to yet another embodiment of the present invention.

In another embodiment, the mounting member 38 is shaped to receive a collar 28 having a chamfered comer 64. The collar 28 in this particular arrangement has two opposing side margins and an end margin connecting the two side margins (FIG. 8). One or both of the corners between the side margins and the end margin can be chamfered 64. The mounting member 38 can be formed with one or more corresponding chamfered corners 62.

During operation, the bag docking assembly 10 is engaged with the dirty air outlet nozzle 20 on the vacuum cleaner 12. The outer bag 22 can first be positioned over the dirty air outlet nozzle 20, and the bag docking assembly 10 is then positioned to hold the outer bag 22 in place.

The anchor member 36 can be installed by first positioning the central opening 40 in the anchor member 36 directly over the dirty air outlet nozzle 20. The anchor member 36 is then pressed so that a protrusion or a rim 43 on the dirty air outlet nozzle 20 is forced through the central opening 40 in the anchor member 36. The shape of the central opening 40 in the anchor member 36 is close enough to the shape of the dirty air outlet nozzle 20 that the rim 43 on the dirty air outlet nozzle 20 retains the anchor member in its proper position for operation. The engagement of first hinge member 48 with second hinge member 58 prevents the entrance channel 44 from distorting, locking the anchor member 36 onto the dirty air outlet nozzle 20.

The anchor member 36 can also be installed by having the engagement section 44 engage the dirty air outlet nozzle 20 from a transverse direction. The neck 46 is forced over the dirty air outlet nozzle 20 and resiliently recovers its original shape, holding the anchor member 36 onto the dirty air outlet nozzle 20. The rim 43 on the dirty air outlet nozzle 20 prevents the anchor member 36 from sliding off of the end of the dirty air outlet nozzle 20.

The mounting member 38 is pivotally attached to the anchor member 36 by the engagement of the first hinge member 48 and the second hinge member 58. In the preferred embodiment, where the first hinge member 48 is positioned for use at the bottom of the anchor member 36, the pivoting axis is substantially horizontal. Consequently, the mounting member 38 can rotate to a vertical orientation, as shown in FIG. 1, in which the second hinge member 58 is at the bottom, i.e., into the working position. From the working position, the mounting member 38 can rotate 180 degrees to a position in which the second hinge member 58 is at the top of the mounting member 38. Between these two positions, the mounting member 38 pivots through a number of orientations in which the mounting member 38 is directed away from the handle assembly 16 and toward the opening of the outer bag 22. In at least one of these positions, defined as a loading position, a user can remove a full vacuum bag 24 from the mounting member 38 and replace it with a new vacuum bag 24. The loading position can be separated from the working position by an angle greater than 90 degrees.

The vacuum bag 24 can be engaged with the bag docking assembly 10 by inserting the collar 28 between the channels 54 on the mounting member 38. When the vacuum bag 24 is fully engaged with the mounting member 38, the bag opening 26 aligns with the opening 52 in the mounting member 38. When the bag docking assembly 10 is rotated into the working position, the bag opening 26 aligns with and engages the dirty air outlet nozzle 20.

Figure 6:
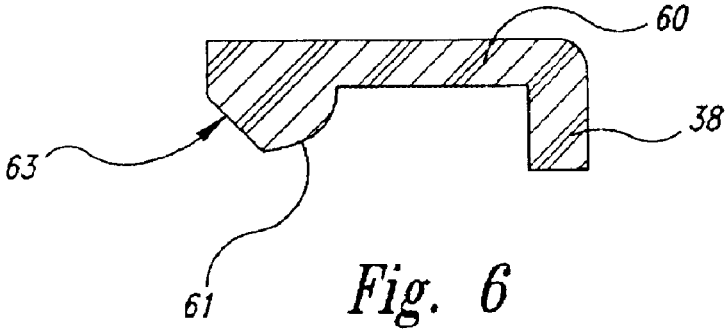
FIG. 6 is a partial section view as viewed along Section 6—6 of FIG. 3 of the mounting member of a bag docking assembly according to one embodiment of the present invention.

In one embodiment, the collar 28 is formed to have a sliding panel 32 that can move between an open and a closed position across the bag opening 26 (FIG. 6). The retainer member 60 has a substantially hemi-spherical portion 61 at its distal end having a beveled front edge 63 that engages the retainer opening 34 when the collar 28 is fully engaged with the mounting member 38. The engagement of the retainer member 60 with the retainer opening 34 operates to close the sliding panel 32 over the bag opening 26 upon removal of the vacuum bag 24 from the mounting member 38. When the user removes the vacuum bag 24 from the mounting member 38, the hemi-spherical portion 61 of the retainer member 60 resists the force exerted by the user. The force necessary to move the sliding panel 32 is less than the force necessary to disengage the retainer member 60 from the retainer opening 34. As a result, the sliding panel 32 remains stationary as the collar 28 is removed from the mounting member 38. Once the sliding panel 32 is fully closed over the bag opening 26, a positive stop 66 in the collar 28 prevents the sliding panel 32 from sliding further. At this point, all of the force exerted by the user is transferred to the retainer member 60. This additional force frees the retainer opening 34 from the retainer member 60 and disengages the vacuum bag 24 from the mounting member 38.

Figure 5:
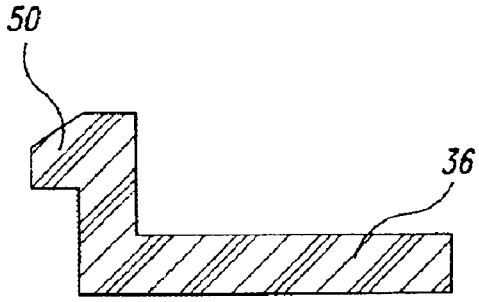
FIG. 5 is a partial section view as viewed along Section 5—5 of FIG. 3 of the anchor member of a bag docking assembly according to one embodiment of the present invention.

In another embodiment, the collar 28 has a recess 65 constructed to surround the retainer member 60 when the collar 28 is engaged with the mounting member 38 (FIG. 5). The collar 28 does not have a sliding panel 32. Consequently, the recess 65 prevents the retainer member 60 from interfering with the collar 28.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A vacuum cleaner bag docking assembly for use with a vacuum bag having a substantially rigid mounting collar surrounding a bag opening and a vacuum cleaner having a dirty air outlet nozzle configured to project through the bag opening and into the vacuum bag; the assembly comprising:

an anchor member having a central opening therein for closely, releasably receiving the dirty air outlet nozzle; and a mounting member releasably coupled to the anchor member to retain the anchor member in engagement with the dirty air outlet nozzle, the mounting member having a portion thereof for engaging the collar to secure the vacuum bag to the mounting member for movement therewith; the mounting member having an opening oriented for registration with the bag opening; the mounting member pivotally connected to the anchor member for movement between a loading position in which the vacuum bag is inserted or removed from the mounting member and a working position in which the bag opening engages the dirty air outlet nozzle.

2. The assembly of claim 1 wherein the dirty air outlet nozzle has an engagement section for receiving the anchor member; the anchor member is composed of a resilient material; and the anchor member has an entrance channel continuous with the central opening and a neck at a point along the entrance channel that is narrower than the engagement section, the anchor member being sufficiently resiliently deformable when the mounting member is disengaged therefrom to permit the anchor member to be mounted on or removed from the dirty air outlet nozzle and sufficiently rigid when the mounting member is engaged therewith to restrict the anchor member from being removed from the dirty air outlet nozzle.

3. The assembly of claim 1 wherein the loading position is separated from the working position by an angle greater than 90 degrees.

4. The assembly of claim 1 wherein the mounting member is substantially planar, the anchor member is substantially planar, and the anchor member is constructed to have a shape complementary to the opening in the mounting member so that the assembly is substantially planar when in the working position.

5. The assembly of claim 4 further comprising a latch operable to releasably retain the assembly in the working position.

6. The assembly of claim 5 wherein the latch comprises a protrusion extending from the edge of the anchor member that engages the opening in the mounting member when the assembly is in the working position.

7. A vacuum cleaner bag docking assembly, as claimed in claim 1, for use with vacuum cleaner bags having a retainer opening in the collar, the assembly comprising:

a protuberance on the mounting member positioned to be received by the retainer opening in the collar to hold the bag in place after insertion.

8. The assembly of claim 7 for use with a vacuum cleaner bag having the retainer opening positioned on a sliding panel in the collar and wherein the protuberance located on the mounting member such that removal of the collar from the mounting member while the protuberance is engaged with the retainer opening causes the sliding panel to move from an open position in which dirt is permitted to enter and exit the bag opening to a closed position in which dirt is prevented from entering or exiting the bag opening.

9. An upright vacuum cleaner comprising:

a handle assembly, at least a portion thereof comprising a dirty air conduit;

*a vacuum bag;* a dirty air outlet nozzle mounted to the handle assembly, the nozzle communicating with the dirty air conduit and projecting from the dirty air conduit for engagement with a vacuum bag;

an anchor member having a central opening for closely, releasably receiving the nozzle, the anchor member being sufficiently deformable to permit the central opening to be engaged with or removed from the nozzle; and a mounting member releasably connected to the anchor member and movable between a loading position in which the vacuum bag is inserted into or removed from the mounting member and a working position in which an opening in the vacuum bag engages the nozzle, the mounting member restricting deformation of the anchor member when connected thereto to restrict the anchor member from being removed from the nozzle.

10. The assembly of claim 9 wherein the loading position is separated from the working position by an angle greater than 90 degrees.

11. The assembly of claim 9 further comprising a latch operable to releasably retain the assembly in the working position.

12. A vacuum cleaner bag docking assembly, as claimed in claim 9, for use with vacuum bags having a retainer opening in the collar, the assembly comprising:

a protuberance on the mounting member positioned to be received by the retainer opening in the collar to hold the vacuum bag in place after insertion.

13. The assembly of claim 12 for use with a vacuum cleaner bag with the retainer opening positioned on a sliding panel in the collar and wherein the protuberance is located on the mounting member such that removal of the collar from the mounting member while the protuberance is engaged with the retainer opening causes the sliding panel to move from an open position in which dirt is permitted to enter and exit the bag opening to a closed position in which dirt is prevented from entering or exiting the bag opening.

14. A vacuum cleaner bag docking assembly, as claimed in claim 1, for use with vacuum cleaner bags in which the collar has opposing side margins, an end margin, and corner portions between the end margin and the opposing side margins, and in which at least one corner portion is beveled at an angle to the end margin and the adjacent side margin; the bag docking assembly comprising a portion which closely conforms to the at least one corner portion.

*15. A vacuum cleaner bag comprising:*

*an air-permeable bag having an opening; and*

*a collar attached to the bag surrounding the opening, the collar having an end edge, a first side edge, a second side edge opposing the first side edge, an orientation surface, and a recess adjacent the end edge,*

*wherein the first and second side edges are in a generally vertical orientation during use, the end edge is in a generally horizontal orientation during use, the first and second side edges are free from the bag, the orientation surface comprises an angled surface extending from the first side edge to the end edge, and the orientation surface is adapted to orient the opening of the bag.*

*16. The vacuum cleaner bag of claim 15, wherein the orientation surface comprises a chamfered corner of the collar.*

*17. The vacuum cleaner bag of claim 15, wherein the collar includes a second orientation surface extending from the second side edge to the end edge.*

*18. The vacuum cleaner bag of claim 15, wherein the collar further includes a retainer opening.*

*19. The vacuum cleaner bag of claim 15, wherein the collar further includes an elastic seal surrounding the bag opening.*

*20. The vacuum cleaner bag of claim 15, wherein the collar further includes a sliding panel that slides between an open position and a closed position over the bag opening.*

*21. The bag of claim 20, wherein the collar further includes a positive stop limiting the movement of the sliding panel.*

*22. The vacuum cleaner bag of claim 20, wherein the collar further includes a retainer opening.*

*23. A bag for receipt in a mounting member having a channel and a first orientation surface, the bag comprising:*

*an air-permeable bag having an opening; and*

*a collar attached to said bag surrounding said opening, said collar having an end edge, a recess adjacent said end edge for surrounding a retainer member of the mounting member, a first side edge, a second side edge opposing said first side edge, and a second orientation surface, said second orientation surface extending from said first side edge to said end edge, said second orientation surface being complementary to the first orientation surface of the mounting member,*

*wherein said second orientation surface is adapted to orient said opening of said bag upon contact with the first orientation surface of the mounting member.*

*24. The bag of claim 23, wherein said second orientation surface comprises a chamfered corner of said collar.*

*25. The bag of claim 23, wherein said collar further includes a retainer opening for engagement with the mounting member.*

*26. The bag of claim 23, wherein said collar includes a third orientation surface extending from said second side edge to said end edge.*

*27. The bag of claim 23, wherein said collar further includes a sliding panel that slides between an open position and a closed position over the bag opening.*

*28. The bag of claim 27, wherein said collar further includes a retainer opening for engaging the mounting member.*

*29. The bag of claim 28, wherein said retainer opening is adapted to engage the mounting member such that a force necessary to move said sliding panel is less than a second force necessary to disengage the mounting member from said retainer opening of said collar.*

*30. The bag of claim 27, wherein said collar further includes a positive stop limiting the movement of said sliding panel.*

*31. The bag of claim 23, wherein said collar has a thickness less than the channel of the mounting member channel.*

*32. A vacuum cleaner assembly comprising:*

*a dirty air outlet nozzle;*

*a vacuum bag having a substantially rigid collar surrounding a bag opening;*

*a bag docking assembly mounted adjacent the dirty air outlet, the bag docking assembly comprising:*

*an anchor member having a central opening for closely, releasably receiving the dirty air outlet, the anchor member being sufficiently deformable to permit the central opening to be engaged with or removed from the dirty air outlet, and*

*a mounting member releasably connected to the anchor member and movable between a loading position in which the vacuum bag is inserted into or removed from the mounting member and a working position in which an opening in the vacuum bag engages the dirty air outlet, the mounting member restricting deformation of the anchor member when connected thereto to restrict the anchor member from being removed from the dirty air outlet.*

*33. The assembly of claim 32 wherein the loading position is separate from the working position by an angle greater then 90 degrees.*

*34. The assembly of claim 32 wherein the mounting member is substantially planar, the anchor member is substantially planar, and the anchor member is constructed to have a shape complementary to the opening in the mounting member so that the assembly is substantially planar when in the working position.*

*35. The assembly of claim 34 further comprising a latch operable to releasably retain the assembly in the working position.*

*36. The assembly of claim 35 wherein the latch comprises a protrusion extending from the edge of the anchor member that engages the opening in the mounting member when the assembly is in the working position.*

*37. The assembly of claim 32 further comprising a retainer member attached to the mounting member for engaging the retainer opening in the vacuum bag.*

*38. The upright vacuum cleaner of claim 9 wherein the vacuum bag further comprises a collar having two opposing sides margins, an end margin, and corner portions between the end margin and the opposing side margins, and in which at least one corner portion is beveled at an angle to the end margin and the adjacent side margin.*

*39. The assembly of claim 32 wherein the substantially rigid collar further comprises opposing side margins, an end margin and corner portions between the end margin and the opposing side margins, at least one of the corner portions being at an angle with respect to the end margin and the adjacent side.*

* * * * *